United States Patent
Jeong et al.

(10) Patent No.: US 11,283,655 B2
(45) Date of Patent: Mar. 22, 2022

(54) TRANSMITTER HAVING MERGED FFE AND XTC, AND TRANSMISSION METHOD THEREOF

(71) Applicant: SEOUL NATIONAL UNIVERSITY R&DB FOUNDATION, Seoul (KR)

(72) Inventors: Deog-Kyoon Jeong, Seoul (KR); KwangHoon Lee, Seoul (KR); Jung Hun Park, Seoul (KR); Han-Gon Ko, Suwon-si (KR); Soyeong Shin, Uiwang-si (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/174,960

(22) Filed: Feb. 12, 2021

(65) Prior Publication Data

US 2021/0258194 A1 Aug. 19, 2021

(30) Foreign Application Priority Data

Feb. 14, 2020 (KR) .......................... 10-2020-0018050

(51) Int. Cl.
*H04L 25/03* (2006.01)
*H04L 27/01* (2006.01)

(52) U.S. Cl.
CPC ........ *H04L 25/03949* (2013.01); *H04L 27/01* (2013.01)

(58) Field of Classification Search
CPC .......................... H04L 25/03949; H04L 27/01
See application file for complete search history.

(56) References Cited

U.S. PATENT DOCUMENTS

| | | | | |
|---|---|---|---|---|
| 2005/0201491 A1* | 9/2005 | Wei | .......................... | H04L 27/02 375/326 |
| 2007/0274379 A1* | 11/2007 | Valliappan | ........ | H04L 25/03343 375/232 |
| 2012/0281746 A1* | 11/2012 | Herrmann | ................ | H04B 3/32 375/229 |
| 2019/0103998 A1* | 4/2019 | Zerbe | ................ | H04L 25/03057 |

OTHER PUBLICATIONS

B. Kim and V. Stojanovic, "A4Gb/s/ch 356fJ/b 10mm Equalized On-chip Interconnect with Nonlinear Charge-Injecting Transmit Filter and Transimpedance Receiver in 90nm CMOS," 2009 IEEE International Solid-State Circuits Conference Dig. Tech. Papers, pp. 66-67, Feb. 9, 2009.

C. Aprile, et al., "An Eight-Lane 7-Gb/s/pin Source Synchronous Single-Ended RX With Equalization and Far-End Crosstalk Cancellation for Backplane Channels," IEEE Journal of Solid-State Circuits, vol. 53, No. 3, pp. 861-872, Mar. 2018.

(Continued)

*Primary Examiner* — Dac V Ha
(74) *Attorney, Agent, or Firm* — Rabin & Berdo, P.C.

(57) ABSTRACT

Provided is a transmitter performing at least feed-forward equalizing and crosstalk cancellation, the transmitter including: a main driver (20) generating waveform including data to be transmitted; and an FFE driver block (40) connected to the main driver in parallel, and generating waveform that is acquired by applying a sum of amplitude for feed-forward equalizing and amplitude for crosstalk cancellation, so as to adjust the waveform generated by the main driver.

9 Claims, 5 Drawing Sheets

$Z=1$ (integer-UI FFE) $Dout[n] = D[n]-w1*D[n-1]$
$Z=t$ (fractional-UI FFE) $Dout[n] = D[n]-w1*D[n-t]$ (56) References Cited

OTHER PUBLICATIONS

H. Jung, et al., "A Transmitter to Compensate for Crosstalk-Induced Jitter by Subtracting a Rectangular Crosstalk Waveform From Data Signal During the Data Transition Time in Coupled Microstrip Lines," IEEE Journal of Solid-State Circuits, vol. 47, No. 9, pp. 2068-2079, Sep. 2012.

S. Kao and S. Liu, "A 7.5-Gb/s One-Tap-FFE Transmitter With Adaptive Far-End Crosstalk Cancellation Using Duty Cycle Detection," IEEE Journal of Solid-State Circuits, vol. 48, No. 2, pp. 391-404, Feb. 2013.

T. Oh and R. Harjani, "A 12-Gb/s Multichannel I/O Using MIMO Crosstalk Cancellation and Signal Reutilization in 65-nm CMOS," IEEE Journal of Solid-State Circuits, vol. 48, No. 6, pp. 1383-1397, Jun. 2013.

\* cited by examiner

TRANSMITTER HAVING MERGED FFE AND XTC, AND TRANSMISSION METHOD THEREOF

CROSS REFERENCE TO RELATED APPLICATION

The present application claims priority to Korean Patent Application No. 10-2020-0018050, filed Feb. 14, 2020, the entire contents of which is incorporated herein for all purposes by this reference.

BACKGROUND OF THE INVENTION

Field of the Invention

The present disclosure relates to a transmitter having a merged FFE and XTC, and a transmission method using the transmitter.

Description of the Related Art

Crosstalk between channels in chip-to-chip communication is one of the most difficult problems to solve in increasing transmission rate.

Several crosstalk cancellation methods (Documents 2, 4, and 5 of the related art below) provided in the related art use a feed-forward crosstalk cancellation method in order to eliminate crosstalk. In the related art, in order to create waveform like crosstalk, a capacitor or a short delay line is employed and next, a feed-forward equalizer (FFE) is added so that a configuration is formed. Unfortunately, because of this system configuration, the degree of complexity of the configuration increases.

Although the problems with the related art have been described, recognition of the problems is not obvious to those skilled in the art to which the present disclosure pertains.

DOCUMENTS OF RELATED ART

1. B. Kim and V. Stojanovic, "A 4 Gb/s/ch 356fJ/b 10 mm equalized on-chip interconnect with nonlinear charge-injecting transmit filter and transimpedance receiver in 90 nm CMOS," *IEEE ISSCC* Dig. Tech. Papers, pp. 66-67, 2009.
2. T. Oh and R. Harjani, "A 12-Gb/s multichannel I/O using MIMO crosstalk cancellation and signal reutilization in 65-nm CMOS," IEEE J. Solid-State Circuits, vol. 48, no. 6, pp. 1383-1397, June 2013.
3. C. Aprile, et al., "An Eight-Lane 7-Gb/s/pin Source Synchronous Single-Ended RX With Equalization and Far-End Crosstalk Cancellation for Backplane Channels," *IEEE JSSC*, vol. 53, no. 3, pp. 861-872, March 2018.
4. S. Kao and S. Liu, "A 7.5-Gb/s One-Tap-FFE Transmitter With Adaptive Far-End Crosstalk Cancellation Using Duty Cycle Detection," in IEEE Journal of Solid-State Circuits, vol. 48, no. 2, pp. 391-404, February 2013.
5. H. Jung, I. Yi, S. Lee, J. Sim and H. Park, "A Transmitter to Compensate for Crosstalk-Induced Jitter by Subtracting a Rectangular Crosstalk Waveform From Data Signal During the Data Transition Time in Coupled Microstrip Lines," in IEEE Journal of Solid-State Circuits, vol. 47, no. 9, pp. 2068-2079, September 2012.

SUMMARY OF THE INVENTION

The present disclosure is directed to providing a transmitter and a transmission method that are capable of reducing the degree of complexity of a system configuration.

According to one aspect of the present disclosure, there is provided a transmitter performing at least feed-forward equalizing and crosstalk cancellation, the transmitter including: a feed-forward equalizer (FFE) (hereinafter, referred to as a "fractional-UI FFE") having a fractional UI; and an encoder controlling output of the fractional-UI FFE by outputting a coefficient that is acquired by applying a sum of amplitude for feed-forward equalizing and amplitude for crosstalk cancellation.

In the transmitter, the fractional-UI FFE may include: a main driver generating waveform including data to be transmitted; an FFE driver block connected to the main driver in parallel, and generating waveform that is acquired by applying the sum of the amplitude for feed-forward equalizing and the amplitude for crosstalk cancellation; and a pulse generator block including an array of pulse generators each generating a pulse for controlling each FFE driver of the FFE driver block, according to the coefficient output from the encoder.

In the transmitter, the encoder may determine the coefficient on the basis of a sum of an amount determined according to a transition type of data to be transmitted through a channel and an amount of compensation for predicted crosstalk determined from a transition type of data to be transmitted through nearby channels.

In the transmitter, when the transition type of data to be transmitted through the channel is a rise, a pull-up transistor may be driven through a pull-up path of the fractional-UI FFE, or when the transition type of data to be transmitted through the channel is a fall, a pull-down transistor may be driven through a pull-down path of the fractional-UI FFE, and a pull-up size or a pull-down size may be increased or decreased according to the amount of compensation for the predicted crosstalk.

According to another aspect of the present disclosure, there is provided a transmitter performing at least feed-forward equalizing and crosstalk cancellation, the transmitter including: a main driver generating waveform including data to be transmitted; and an FFE driver block connected to the main driver in parallel, and generating waveform that is acquired by applying a sum of amplitude for feed-forward equalizing and amplitude for crosstalk cancellation, so as to adjust the waveform generated by the main driver.

The transmitter may further include: an encoder outputting a coefficient that is acquired by applying the sum of the amplitude for feed-forward equalizing and the amplitude for crosstalk cancellation; and a pulse generator block including an array of pulse generators each generating a pulse for controlling each FFE driver of the FFE driver block, according to the coefficient output from the encoder.

In the transmitter, the encoder may determine the coefficient on the basis of a sum of an amount determined according to a transition type of data to be transmitted through a channel and an amount of compensation determined according to predicted crosstalk from nearby channels.

In the transmitter, in the pulse generated by the pulse generator, a pulse width turning on transistors of the FFE driver block may correspond to a fractional UI.

In the transmitter, when a transition type is a rise, pull-up transistors included in the FFE driver block may be driven, or when the transition type is a fall, pull-down transistors included in the FFE driver block may be driven, and a pull-up size of the pull-up transistors or a pull-down size of the pull-down transistors may be increased or decreased according to the crosstalk.

In the transmitter, the main driver may be realized as an inverter having a current source, and the pull-up transistors of the FFE driver block may be PMOS transistors each having an end that is connected to an output of the main driver, and the pull-down transistors of the FFE driver block may be NMOS transistors each having an end that is connected to the output of the main driver.

According to another aspect of the present disclosure, there is provided a transmission method performed by a transmitter transmitting data through multiple channels, the transmission method including: determining an adjustment amplitude by adding an amount of pre-emphasis determined from a transition type of data to be transmitted through one channel of the multiple channels and an amount of compensation for predicted crosstalk determined from a transition type of data to be transmitted through nearby channels adjacent to the one channel; and simultaneously adjusting, on the basis of the determined adjustment amplitude, amplitudes of signals to be transmitted through the one channel.

In the transmission method, the adjusting may be performed within a fraction UI.

According to the present disclosure, XTC is simply realized by being merged with the FFE, so that the degree of complexity of a system configuration can be significantly reduced. Compared to the several crosstalk cancellation methods (for example, Documents 2, 4, and 5 of the related art) provided in the related art, crosstalk can be eliminated by using a simple circuit. In the feed-forward crosstalk cancellation methods (Documents 2, 4, and 5 of the related art) provided in the related art, in order to create waveform (a differentiated form of transmitted waveform) like crosstalk, a capacitor or a short delay line is used and next, an FFE is added thereto in parallel so that a configuration is formed. However, according to the present disclosure, an FFE is constructed having a fractional UI so that operates only for a short time, and crosstalk is eliminated by changing the size of a coefficient of the FFE.

In the transmitter of the present disclosure, provided is a circuit structure capable of eliminating crosstalk at a reception end by distorting a signal in advance as much as there is crosstalk. The provided structure is combined with a feed-forward equalizer (FFE) that is generally used to compensate for channel loss in chip-to-chip communication, so that an additional circuit for crosstalk cancellation can be minimized.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, exemplary embodiments of the present disclosure will be described in detail with reference to the accompanying drawings such that the present disclosure can be easily embodied by those skilled in the art to which this present disclosure pertains. However, the present disclosure may be embodied in various different forms and should not be limited to the embodiments set forth herein. Further, in order to clearly describe the present disclosure, elements that are not related to the present disclosure are omitted in the drawings, and similar names and similar reference numerals denote similar elements throughout the specification.

Figure 1A:
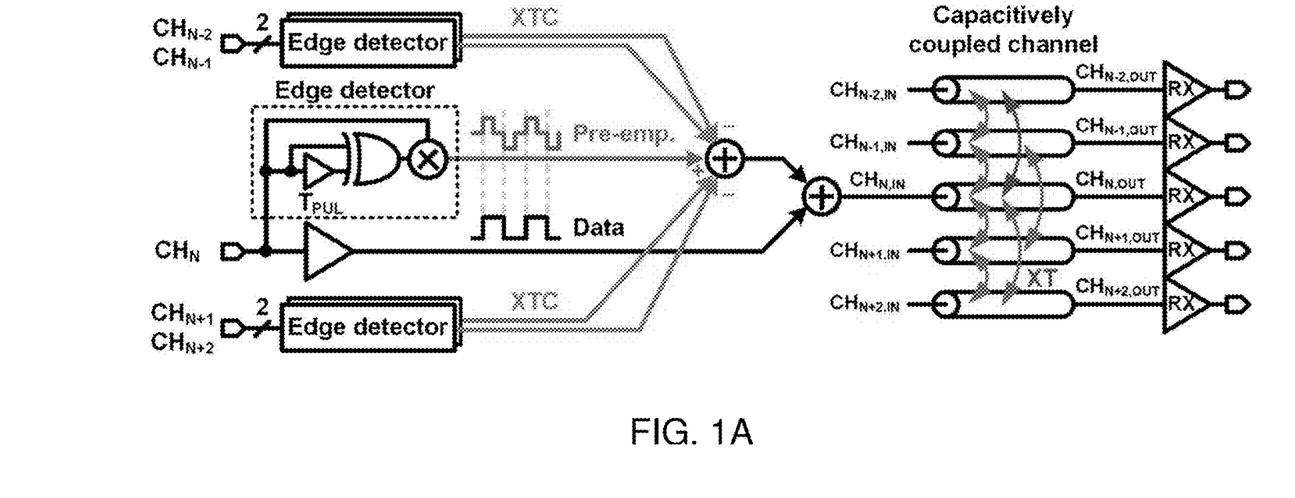
FIG. 1A is a conceptual diagram for illustrating a crosstalk cancellation method proposed in the present disclosure.
Figure 1B:
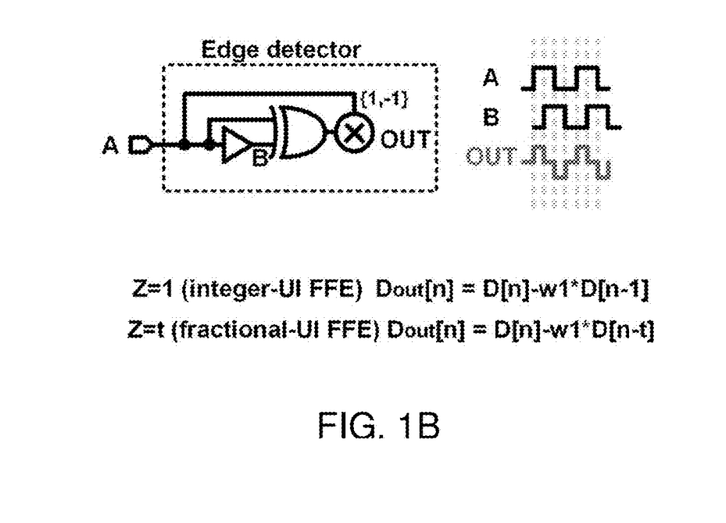
FIG. 1B shows an example of a configuration of an edge detector and waveforms at main points.

FIG. 1A is a conceptual diagram for illustrating a crosstalk cancellation method proposed in the present disclosure, and FIG. 1B shows an example of a configuration of an edge detector and waveforms at main points.

FIGS. 1A and 1B only show the concept of the present disclosure, and a detailed realization method thereof will be described later. FIGS. 1A and 1B focus on any one channel. Regarding operation of a feed-forward equalizer (FFE), fundamentally, in order to boost (pre-emphasis) a high-frequency component, a transition part (a part with an edge) is amplified and signals are transmitted. The expression $T_{pul}$ of FIG. 1A denotes the width of a pulse for such boosting.

In the meantime, crosstalk is in the form in which a transmitted signal is differentiated, and affects a nearby channel, so that crosstalk also occurs at a part at which an aggressor makes a transition. Therefore, by subtracting, from the amplitude of transmission waveform, the product of amplitude for an FFE of a nearby channel (aggressor) and a predetermined coefficient, crosstalk to be applied later to a nearby channel is canceled. The expression XTC of FIG. 1A denotes a pre-compensation signal for canceling crosstalk as described above, and such signals are merged with a pre-emphasis waveform.

The configuration of the edge detector shown in FIG. 1B is for conceptual understanding. As an input data signal passes through a buffer, delay occurs. The signal at point B becomes a signal with delay, compared to the signal at point A. Afterward, using an XOR gate, a value of 1 is output for a section in which the signal at point A and the signal at point B have different values. The section holding a value of 1 in the output signal is denoted by $T_{pul}$.

In the meantime, in order to distinguish between a positive edge and a negative edge, the output value of the XOR gate is multiplied by the data signal so that a pre-emphasis pulse is generated. To understand positive and negative amplitudes, if it is considered for convenience that a data signal having a value of +1 or −1 is transmitted, a positive or negative pulse is generated through the operation shown in FIG. 1B. In order to match the pulses to a logical 0 and a logical 1, the actual circuit is realized in the same manner as a pulse generator shown in FIG. 4. A circuit that generates a positive pulse and a negative pulse is configured separately, so that values of 0 and 1 are realized (FIGS. 1A and 1B conceptually shows that change to a value of −1 is made considering the fact that it is difficult to apply a value of 0 to the operation because of the characteristic of 0).

Figure 2:
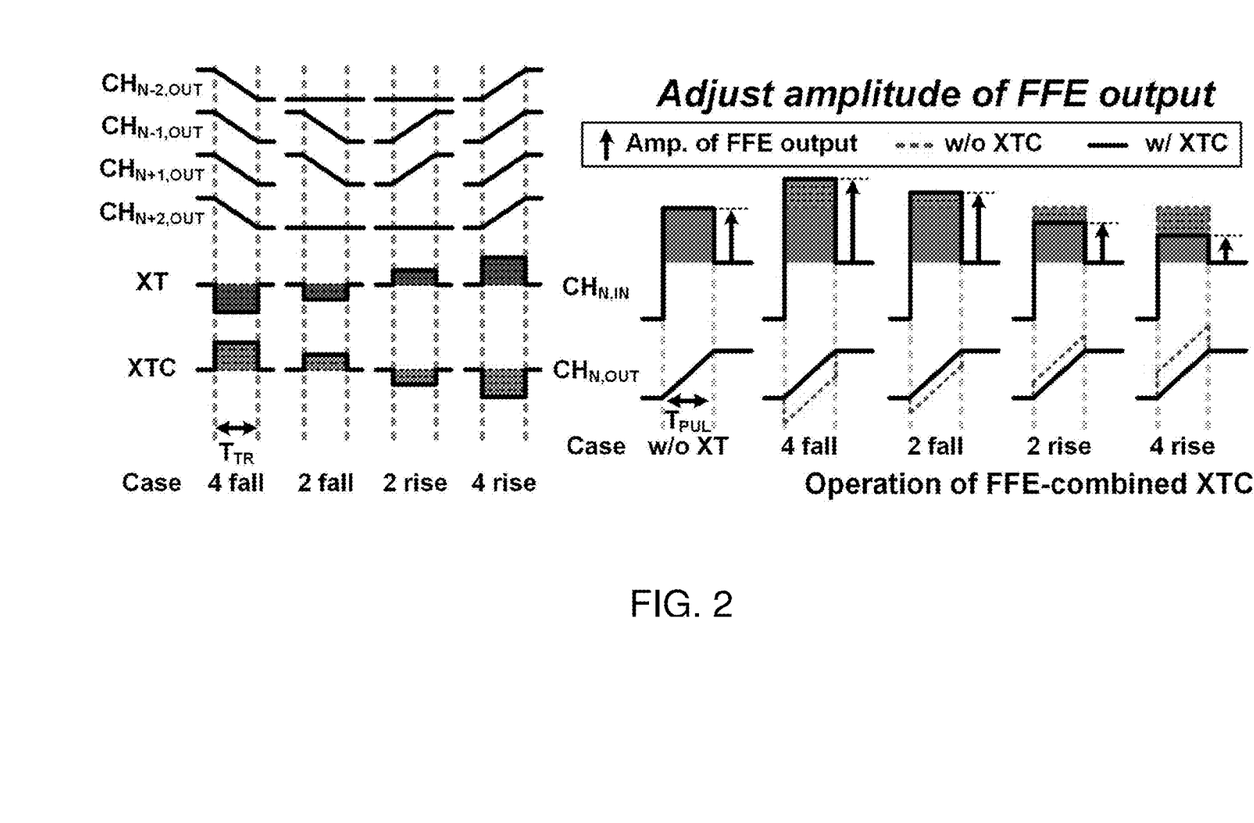
FIG. 2 shows examples of waveforms for illustrating operation of a proposed crosstalk cancellation method.

FIG. 2 shows examples of waveforms for illustrating operation of a proposed crosstalk cancellation method.

First, referring to the 4 fall case, when all nearby channels are in a falling transition, crosstalk occurs in a negative direction. To cancel the crosstalk, crosstalk cancellation waveform (see the expression XTC of FIG. 2) needs to be generated in a positive direction and added to the channel that is in the middle of transmission. At this point, making the output (adjustment amplitude) of the FFE larger has the same effect as adding waveform for XTC (crosstalk cancellation). Conversely, referring to the 4 rise case, when all nearby channels are in a rising transition, crosstalk occurs in a positive direction. To cancel the crosstalk, the output (adjustment amplitude) of the FFE needs to be made smaller. Referring to the 2 rise and the 2 fall case, the size of XT (crosstalk) is relatively small, so the output (adjustment amplitude) of the FFE needs to be adjusted less.

Figure 3:
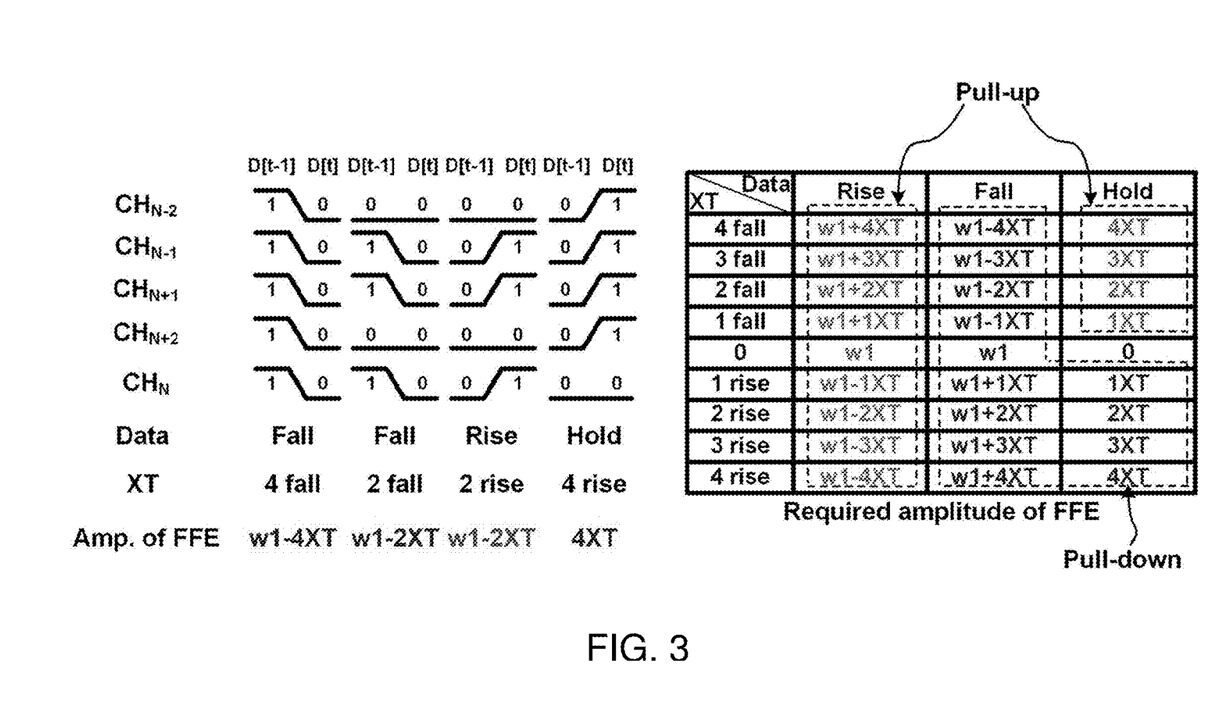
FIG. 3 shows an example for illustrating a principle of determining an adjustment amplitude in an encoder included in a transmitter according to an embodiment of the present disclosure.

FIG. 3 shows an example for illustrating a principle of determining an adjustment amplitude in an encoder included in a transmitter according to an embodiment of the present disclosure.

The encoder (see reference numeral 10 of FIG. 4) calculates, from a transmission data pattern of nearby channels, the amount of predicted crosstalk that is likely to affect the corresponding channel. Afterward, the transition direction of data to be transmitted is identified, and the size (w1) of FFE tap1 for compensating for channel loss is calculated. When data to be transmitted is in a rising transition, the size of FFE tap1 is w1. When data to be transmitted is in a falling transition, the size is −w1. When there is no transition, the size is 0. In addition, the size (denoted by XT) of crosstalk is subtracted from the size of FFE tap1 and the size of the required FFE output is output.

For example, in the leftmost case in FIG. 3, data to be transmitted is in a falling transition and all nearby channels are in a falling transition. In this case, the amount of crosstalk is −4XT and the size of FFE tap1 is −w1. The size for which the FFE output is to be driven is −w1+4XT=−(w1−4XT). Since the size of the required output is a negative number, driving with the size of w1−4XT needs to take place through a pull-down path (see FIG. 4). The size of the required FFE output is converted into an n-bit digital signal for transmission to the FFE.

For example, in transmitting a value of 1 as current data, when the previous data has a value of 1, the current data is transmitted without a large change in voltage. However, when the previous data has a value of 0, the voltage needs to be increased for a change from 0 to 1. Herein, when a change from 0 to 1 is detected, the FFE increases the strength of a driver to help a voltage rise. Similarly, when a change from 1 to 0 is detected, the FFE also increase the strength of the driver to help a voltage drop.

In the right table of FIG. 3, column RISE and column FALL correspond to the former and the latter, respectively. Herein, the amplitude for feed-forward equalizing is denoted by w1. The expression HOLD means no data change, and in this case, the amplitude for feed-forward equalizing is 0.

In addition, if crosstalk is involved in data transmission, the crosstalk is canceled in the same manner by adjusting the strength of the driver according to each situation. For example, suppose that data has a change from 1 to 0 in only one of nearby channels (1 fall). In this case, negative crosstalk also occurs in the present channel. If a rise data change from 0 to 1 occurs in the present channel, the strength of the driver is additionally increased as much as there is negative crosstalk occurring in the nearby channel, thereby cancelling the influence of crosstalk. If this degree is called XT, the strength of the FFE is w1+XT that is a result of adding XT to the existing w1. Conversely, suppose that FALL from 1 to 0 occurs in the present channel. In this case, negative crosstalk occurring in the nearby channel helps data change in the present channel, so a desired effect is acquired by appropriately reducing the output strength of the FFE. Therefore, the output strength of the FFE is w1−XT. If the number of nearby channels in which data change occurs is large, XT is multiplied by the number of the channels to make a change.

Hereinafter, a circuit that may be actually realized based on the above-described concept will be described.

Figure 4:
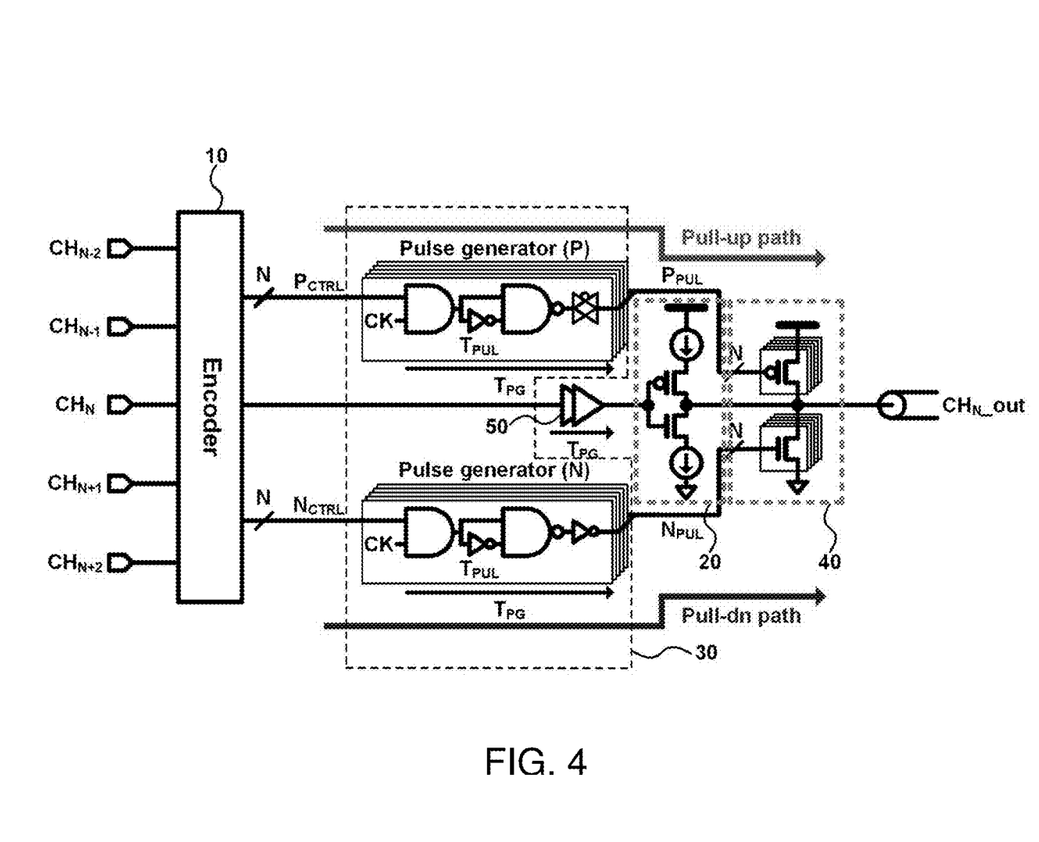
FIG. 4 shows an example of a transmitter that performs at least feed-forward equalizing and crosstalk cancellation simultaneously according to an embodiment of the present disclosure.

FIG. 4 shows an example of a transmitter that performs at least feed-forward equalizing and crosstalk cancellation simultaneously according to an embodiment of the present disclosure.

According to the embodiment of the present disclosure, the transmitter includes an encoder 10, a main driver 20, a pulse generator block 30, an FFE driver block 40, and a delay circuit 50. For convenience, FIG. 4 focuses on one channel. Since an array of multiple channels are generally provided in chip-to-chip communication, the main driver 20, the pulse generator block 30, the FFE driver block 40, and the delay circuit 50 are provided for each of the channels and one encoder 10 may be provided for the multiple channels.

The main driver 20 drives a channel by generating waveform including data to be transmitted, according to a signal from the encoder 10. The main driver 20 is realized as an inverter having a current source. The inverter drives an input terminal of a channel, for example, pulling up or down the output voltage, and so on, according to a signal from the encoder 10 as an input. The main driver 20 and each FFE driver of the FFE driver block 40 may use various structures including a CMOS driver structure having a simple inverter structure.

The FFE driver block 40 is connected to the main driver 20 in parallel. The output of the FFE driver block 40 and the output of the main driver 20 are connected to a common node to drive a channel simultaneously. The FFE driver block 40 generates waveform acquired by applying the sum of the amplitude for feed-forward equalizing and the amplitude for crosstalk cancellation, and adjusts the size of a signal that the main driver 20 drives.

Each FFE driver of the FFE driver block 40 has a structure in which one PMOS transistor and one NMOS transistor are connected to each other, specifically, a pull-up transistor and a pull-down transistor are connected to each other at a connection node and a gate of each of the transistors receives a control signal from a pulse generator. As many FFE drivers as the number N of bits of a coefficient output from the encoder 10 may be provided.

The pull-up transistors of the FFE driver block 40 are PMOS transistors each having an end that is connected to the output of the main driver 20, and the pull-down transistors of the FFE driver block are NMOS transistors each having an end that is connected to the output of the main driver 20. Since an end of each of the transistors constituting the FFE driver block 40 is connected to the common node, a channel is driven.

The pulse generator block 30 generates a pulse for controlling each FFE driver of the FFE driver block 40, according to a coefficient $P_{ctrl}$, $N_{ctrl}$ output from the encoder, and includes an array of multiple pulse generators. The pulse generator block 30 includes multiple pulse generators in a pull-up path, and symmetrically includes multiple pulse generators in a pull-down path.

Referring to each of the pulse generators, first, using an AND gate, logical conjunction is performed on a coefficient signal and a clock signal (CK) output from the encoder so that the clock signal passes through when the coefficient signal has a value of 1. In addition, the expression $T_{pul}$ denotes the width of a pulse generated by the pulse generator, and is set using the amount of delay that occurs when passing through an inverter between the AND gate and the NAND gate takes place. When the coefficient signal has a value of 1, the NAND gate outputs a pulse (normally having a value of 1) having a value of 0 for the time corresponding to $T_{pul}$ and a switch at the rear end determines whether to transmit the pulse or not.

In addition, a delay $T_{PG}$ occurring when data passes a delay line of a main path (the middle line) needs to be the same as a delay after a digital signal ($P_{ctrl}$ signal, $N_{ctrl}$ signal) is received from the encoder 10 and passes through the pulse generator, so that eventual data transmissions coincide in timing. Therefore, the total delay after the pulse generator is passed is also $T_{PG}$. The delay circuit 50 is to create a delay of $T_{PG}$.

The pulse generator block 30 and the FFE driver block 40 constitute a feed-forward equalizer (FFE) according to the present disclosure. The feed-forward equalizer (FFE) according to the present disclosure is an FFE having a fractional UI (hereinafter, referred to as a "fractional-UI FFE") as described later.

In a pulse that the pulse generator generates, the pulse width that turns on transistors of the FFE driver block corresponds to a fractional unit interval (UI).

The encoder 10 controls the output of the fractional-UI FFE by outputting a coefficient that is acquired by applying the sum of the amplitude for feed-forward equalizing and the amplitude for crosstalk cancellation. The encoder 10 determines a coefficient $P_{ctrl}$, $N_{ctrl}$ on the basis of the sum of an amount determined according to a transition type of data to be transmitted through a channel and the amount of compensation for predicted crosstalk determined from a transition type of data to be transmitted through nearby channels.

When a transition type of data to be transmitted through a channel is a rise, a pull-up transistor of an FFE driver is driven through the pull-up path of the fractional-UI FFE. When the transition type of data to be transmitted through the channel is a fall, a pull-down transistor of the FFE driver is driven through the pull-down path of the fractional-UI FFE. Simultaneously, a pull-up size or a pull-down size is increased or decreased according to the amount of compensation for predicted crosstalk.

The encoder 10 identifies a data pattern of a channel ($CH_N$) through which actual transmission is performed and nearby channels (for example, $CH_{N-2}$, $CH_{N-1}$, $CH_{N+1}$, and $CH_{N+2}$) that cause crosstalk, and provides data to the main driver 20. In addition thereto, the encoder 10 encodes a coefficient for equalizing and compensating for crosstalk into a digital signal and also provides the resulting signal.

The coefficient $P_{ctrl}$, $N_{ctrl}$ that the encoder 10 provides is an n-bit signal that is made to have a size the same as that in the table shown in FIG. 3, for example. A required size (required amplitude) is encoded into an n-bit signal and the resulting signal is provided, wherein when pull-up adjustment is required, a corresponding transistor of an array of pull-up transistors is turned on through the pull-up path, or when pull-down adjustment is required, a corresponding transistor of an array of pull-down transistors is turned on through the pull-down path.

The encoder generates output corresponding to an FFE coefficient value converted into a digital signal, so that a channel is driven. In the embodiment shown in FIG. 4, a fractional-UI FFE structure using the pulse generators and a driver structure provided in Document 1 of the related art are used. Using the structure, compared to an integer-UI FFE structure, a receiver receives a clean waveform resulting from cancellation of crosstalk applied in a channel.

Figure 5:
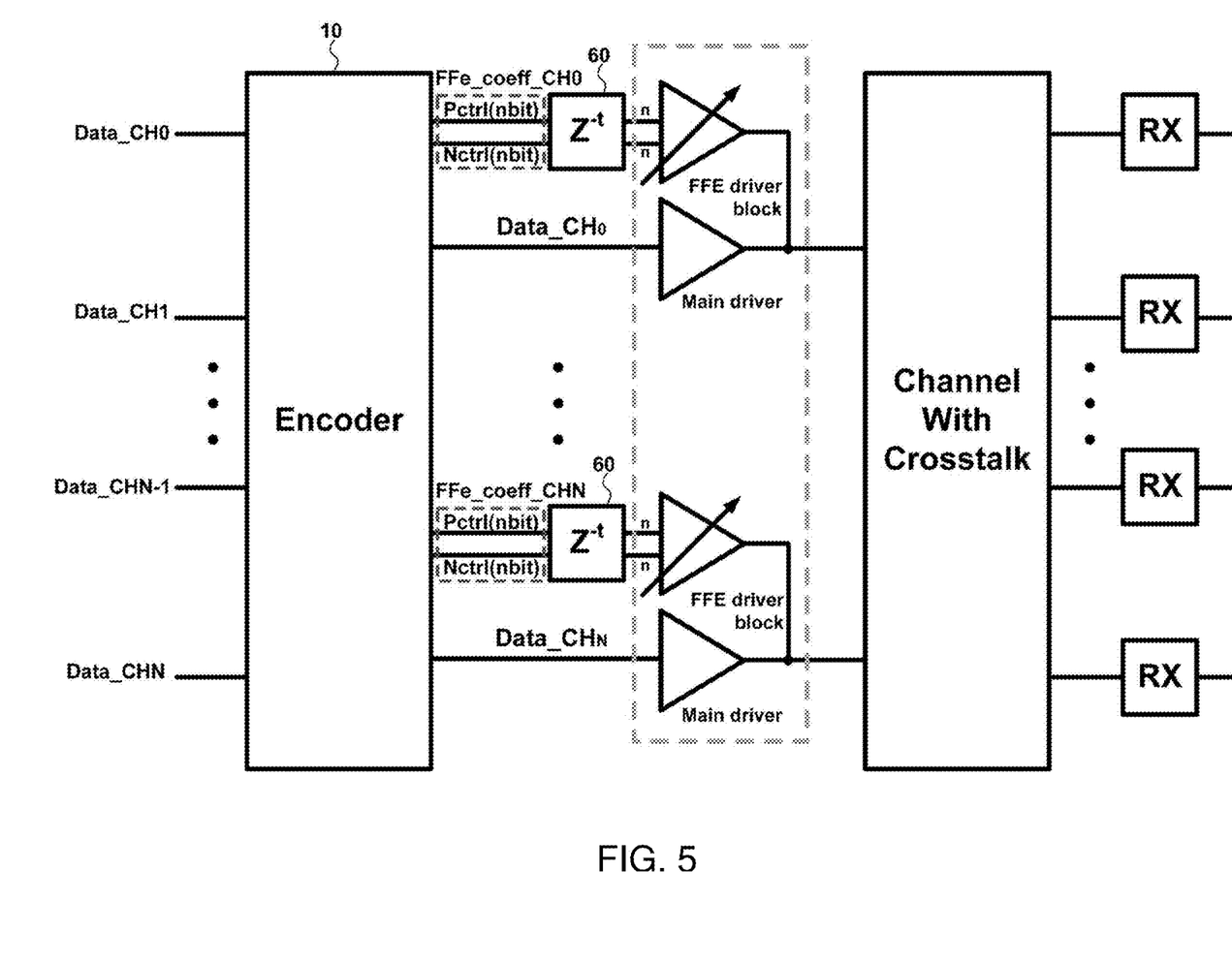
FIG. 5 shows all channels as a more general embodiment of the present disclosure from a slightly different standpoint.

FIG. 5 shows all channels as a more general embodiment of the present disclosure from a slightly different standpoint.

A $Z^{-t}$ block 60 includes a delay element and corresponds to the function of the pulse generator block 30 described above with reference to FIG. 4. The $Z^{-t}$ block 60 realigns already transmitted data on the basis of data at the timing of transmission, and makes information on which feed forward equalization and crosstalk cancellation are performed applied according to the timing so as to be transmitted at the timing.

In the case of $Z^{-t}=Z^{-1}$, the FFE becomes a general 1-tap FFE, which means that one piece of preceding data is to be referred to. In the case of $Z^{-t}=Z^{-0.5}$, however, this means that preceding data information corresponding to 0.5 UI is to be referred to, and for a delay less than 1 UI, the FFE becomes a fractional-UI FFE. In a pulse that the pulse generator generates, the pulse width that turns on the transistors of the FFE driver block corresponds to a fractional UI.

The expression $FFE\_coeff\_CH_N$ corresponds to both the $P_{ctrl}$ and the $N_{ctrl}$ signal in FIG. 4, and the pull-up and the pull-down path are shown being put together. FIG. 4 shows the encoder corresponding to one channel, but FIG. 5 shows that, for N+1 channels, encoders corresponding to N+1 channels are provided separately or in an integrated manner.

A type of channels is determined depending on what application is used. An FFE coefficient (without crosstalk) is determined on the basis of channel information. In addition, in the case of an application having a channel pitch to which the present disclosure can be applied, the amount of crosstalk to be canceled is determined depending on how many nearby channels are referred to on the basis of the corresponding channel, and this process is applied to the equalizing process so as to be performed simultaneously. The FFE coefficient at this point is a value acquired by applying crosstalk cancellation to the original FFE coefficient.

According to the present disclosure, a transmission method performed by the transmitter transmitting data through multiple channels roughly includes two steps.

A first step is mainly performed by an encoder. At the first step, an adjustment amplitude is determined by adding the amount of pre-emphasis determined from a transition type of data to be transmitted through one channel of multiple channels and the amount of compensation for predicted crosstalk determined from a transition type of data to be transmitted through nearby channels adjacent to the one channel. The adjustment amplitude is determined using the FFE coefficient, for example, the output $P_{ctrl}$, $N_{ctrl}$ of the encoder, which is provided to the fractional-UI FFE.

At a second step, on the basis of the determined adjustment amplitude, amplitudes of signals to be transmitted through the one channel are adjusted simultaneously, wherein the adjusting is performed within the fraction UI. The adjusting of the amplitudes of the signals to be transmitted is performed by the FFE (FFE driver), and such adjustment may be performed simultaneously in real time with respect to waveform generated by the main driver for data transmission.

The embodiment shown in FIGS. 1A, 1B, and 2 represents the case in which four nearby channels give an influence of crosstalk, but the present disclosure is applicable to various cases in which N (N is an integer equal to or greater than 1) nearby channels affect one channel. The encoder of FIG. 4 may receive data transmitted through a larger number of nearby channels, and the encoding table shown in FIG. 3 may have more entries. In the embodiment of FIG. 3, in constructing the encoding table, it is assumed that the amounts of crosstalk from the nearby channels are the same, but in practice, different amounts of crosstalk are from respective channels, and despite this, the encoding table may be constructed in the same manner. The configuration of the driver shown in the embodiment of FIG. 4 may be changed, and various drivers capable of adjusting the size of the output of the FFE through digital code may be used.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A transmitter performing at least feed-forward equalizing and crosstalk cancellation, the transmitter comprising:
   a feed-forward equalizer (FFE) having a fractional unit interval (hereinafter, referred to as "fractional-UI FFE"); and
   an encoder controlling output of the fractional-UI FFE by outputting a coefficient that is acquired by applying a sum of amplitude for feed-forward equalizing and amplitude for crosstalk cancellation,
   wherein the encoder determines the coefficient on the basis of a sum of an amount determined according to a transition type of data to be transmitted through a channel and an amount of compensation for predicted crosstalk determined from a transition type of data to be transmitted through nearby channels.

2. The transmitter of claim 1, wherein the fractional-UI FFE comprises:
   a main driver generating waveform including data to be transmitted;
   an FFE driver block connected to the main driver in parallel, and generating waveform that is acquired by applying the sum of the amplitude for feed-forward equalizing and the amplitude for crosstalk cancellation; and
   a pulse generator block including an array of pulse generators each generating a pulse for controlling each FFE driver of the FFE driver block, according to the coefficient output from the encoder.

3. The transmitter of claim 1, wherein when the transition type of data to be transmitted through the channel is a rise, a pull-up transistor is driven through a pull-up path of the fractional-UI FFE, or when the transition type of data to be transmitted through the channel is a fall, a pull-down transistor is driven through a pull-down path of the fractional-UI FFE, and
   a pull-up size or a pull-down size is increased or decreased according to the amount of compensation for the predicted crosstalk.

4. A transmitter performing at least feed-forward equalizing and crosstalk cancellation, the transmitter comprising:
   a main driver generating waveform including data to be transmitted;
   a feed-forward equalizer (FFE) driver block connected to the main driver in parallel, and generating waveform that is acquired by applying a sum of amplitude for feed-forward equalizing and amplitude for crosstalk cancellation, so as to adjust the waveform generated by the main driver;
   an encoder outputting a coefficient that is acquired by applying the sum of the amplitude for feed-forward equalizing and the amplitude for crosstalk cancellation; and
   a pulse generator block including an array of pulse generators each generating a pulse for controlling each FFE driver of the FFE driver block, according to the coefficient output from the encoder,
   wherein the encoder determines the coefficient on the basis of a sum of an amount determined according to a transition type of data to be transmitted through a channel and an amount of compensation determined according to predicted crosstalk from nearby channels.

5. The transmitter of claim 4, wherein when a transition type is a rise, pull-up transistors included in the FFE driver block are driven, or when the transition type is a fall, pull-down transistors included in the FFE driver block are driven, and
   a pull-up size of the pull-up transistors or a pull-down size of the pull-down transistors is increased or decreased according to the crosstalk.

6. The transmitter of claim 5, wherein the main driver is realized as an inverter having a current source, and
   the pull-up transistors of the FFE driver block are P-channel metal-oxide-semiconductor (PMOS) transistors each having an end that is connected to an output of the main driver, and the pull-down transistors of the FFE driver block are N-channel metal-oxide-semiconductor (NMOS) transistors each having an end that is connected to the output of the main driver.

7. A transmitter performing at least feed-forward equalizing and crosstalk cancellation, the transmitter comprising:
   a main driver generating waveform including data to be transmitted;
   a feed-forward equalizer (FFE) driver block connected to the main driver in parallel, and generating waveform that is acquired by applying a sum of amplitude for feed-forward equalizing and amplitude for crosstalk cancellation, so as to adjust the waveform generated by the main driver;
   an encoder outputting a coefficient that is acquired by applying the sum of the amplitude for feed-forward equalizing and the amplitude for crosstalk cancellation; and
   a pulse generator block including an array of pulse generators each generating a pulse for controlling each FFE driver of the FFE driver block, according to the coefficient output from the encoder,
   wherein in the pulse generated by the pulse generator, a pulse width turning on transistors of the FFE driver block corresponds to a fractional unit interval (UI).

8. A transmission method performed by a transmitter transmitting data through multiple channels, the transmission method comprising:
   determining an adjustment amplitude by adding an amount of pre-emphasis determined from a transition type of data to be transmitted through one channel of the multiple channels and an amount of compensation for predicted crosstalk determined from a transition type of data to be transmitted through nearby channels adjacent to the one channel; and
   simultaneously adjusting, on the basis of the determined adjustment amplitude, amplitudes of signals to be transmitted through the one channel.

9. The transmission method of claim 8, wherein the adjusting is performed within a fraction unit interval (UI).

* * * * *